United States Patent
Wen et al.

(10) Patent No.: US 11,568,219 B2
(45) Date of Patent: Jan. 31, 2023

(54) MULTIPLE ACCELERATORS FOR NEURAL NETWORK

(71) Applicant: Aspiring Sky Co. Limited, Hong Kong (CN)

(72) Inventors: Yujie Wen, Shanghai (CN); Zhijiong Luo, Hopewell Township, PA (US)

(73) Assignee: Aspiring Sky Co. Limited, Hong Kong (CN)

( * ) Notice: Subject to any disclaimer, the term of this patent is extended or adjusted under 35 U.S.C. 154(b) by 267 days.

(21) Appl. No.: 15/931,771

(22) Filed: May 14, 2020

(65) Prior Publication Data
US 2020/0364544 A1 Nov. 19, 2020

Related U.S. Application Data (60) Provisional application No. 62/849,178, filed on May 17, 2019.

(51) Int. Cl.
*G06N 3/063* (2006.01)
*G06F 9/50* (2006.01)

(52) U.S. Cl.
CPC ........... *G06N 3/063* (2013.01); *G06F 9/5027* (2013.01); *G06F 9/5077* (2013.01)

(58) Field of Classification Search
CPC ............................. G06N 3/063; G06F 9/5025
See application file for complete search history.

(56) References Cited

U.S. PATENT DOCUMENTS

| | | | |
|---|---|---|---|
| 9,940,534 B1 | 4/2018 | Yang et al. | |
| 10,255,400 B1* | 4/2019 | Villarreal | G06F 30/327 |
| 10,552,733 B2* | 2/2020 | Torng | G11C 11/005 |
| 10,732,982 B2* | 8/2020 | Pennala | G06F 9/5083 |
| 10,783,437 B2* | 9/2020 | Feng | G06N 3/0454 |
| 2008/0126274 A1* | 5/2008 | Jannarone | G06N 3/08 706/12 |
| 2019/0056955 A1* | 2/2019 | Pennala | G06F 9/5077 |
| 2019/0318231 A1* | 10/2019 | Wang | G06N 3/063 |
| 2020/0364544 A1* | 11/2020 | Wen | G06F 9/5027 |

OTHER PUBLICATIONS

Efficient object detection using embedded binarized neural networks, Journal of Signal Processing Systems, Jun. 2018, vol. 90, Issue 6 pp. 11.

* cited by examiner

*Primary Examiner* — Mohammed H Rehman
(74) *Attorney, Agent, or Firm* — RatnerPrestia (57) ABSTRACT

Technologies are described for multiple accelerators for a neural network, and methods thereof. In an example implementation, a neural network can be mapped to a system comprising a control unit and multiple accelerators, where the controller unit controls each accelerator's behavior, sends data to and receives data from each accelerator through the interconnections. Sub-networks may be created by grouping several network layers or dividing a network layer into multiple sub-layers depending on data to be processed and memory capacity of each accelerator. Accelerators have internal storage, thus, do not require external memory.

18 Claims, 10 Drawing Sheets

MULTIPLE ACCELERATORS FOR NEURAL NETWORK

CROSS REFERENCE TO RELATED APPLICATIONS

This application claims the benefit of U.S. Provisional Patent Application Ser. No. 62/849,178 filed on May 17, 2019. The disclosures of the provisional application are hereby incorporated by reference for all purposes.

BACKGROUND

Unless otherwise indicated herein, the materials described in this section are not prior art to the claims in this application and are not admitted to be prior art by inclusion in this section.

Artificial neural networks are computing systems inspired by the biological neural networks that constitute brains. Such systems learn to perform tasks by considering examples, generally without being programmed with task-specific rules. They automatically generate identifying characteristics from the examples that they process. Artificial neural networks are used on a variety of tasks, including computer vision, speech recognition, machine translation, social network filtering, playing board and video games, medical diagnosis, and comparable ones.

SUMMARY

Briefly stated, technologies are generally described herein for multiple accelerators for neural networks, and methods thereof.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description and drawings are not meant to be limiting. Other embodiments may be utilized, and other changes may be made, without departing from the spirit or scope of the subject matter presented herein. The aspects of the present disclosure, as generally described herein, and illustrated in the figures, can be arranged, substituted, combined, separated, and designed in a wide variety of different configurations, all of which are explicitly contemplated herein.

This disclosure is generally drawn, inter alia, to technologies for multiple accelerators for a neural network, and methods thereof. In an example implementation, a neural network can be mapped to a system comprising a control unit and multiple accelerators, where the controller unit controls each accelerator's behavior, sends data to and receives data from each accelerator through the interconnections. Sub-networks may be created by grouping several network layers or dividing a network layer into multiple sub-layers depending on data to be processed and memory capacity of each accelerator. Accelerators have internal storage, thus, do not require external memory.

Figure 1:
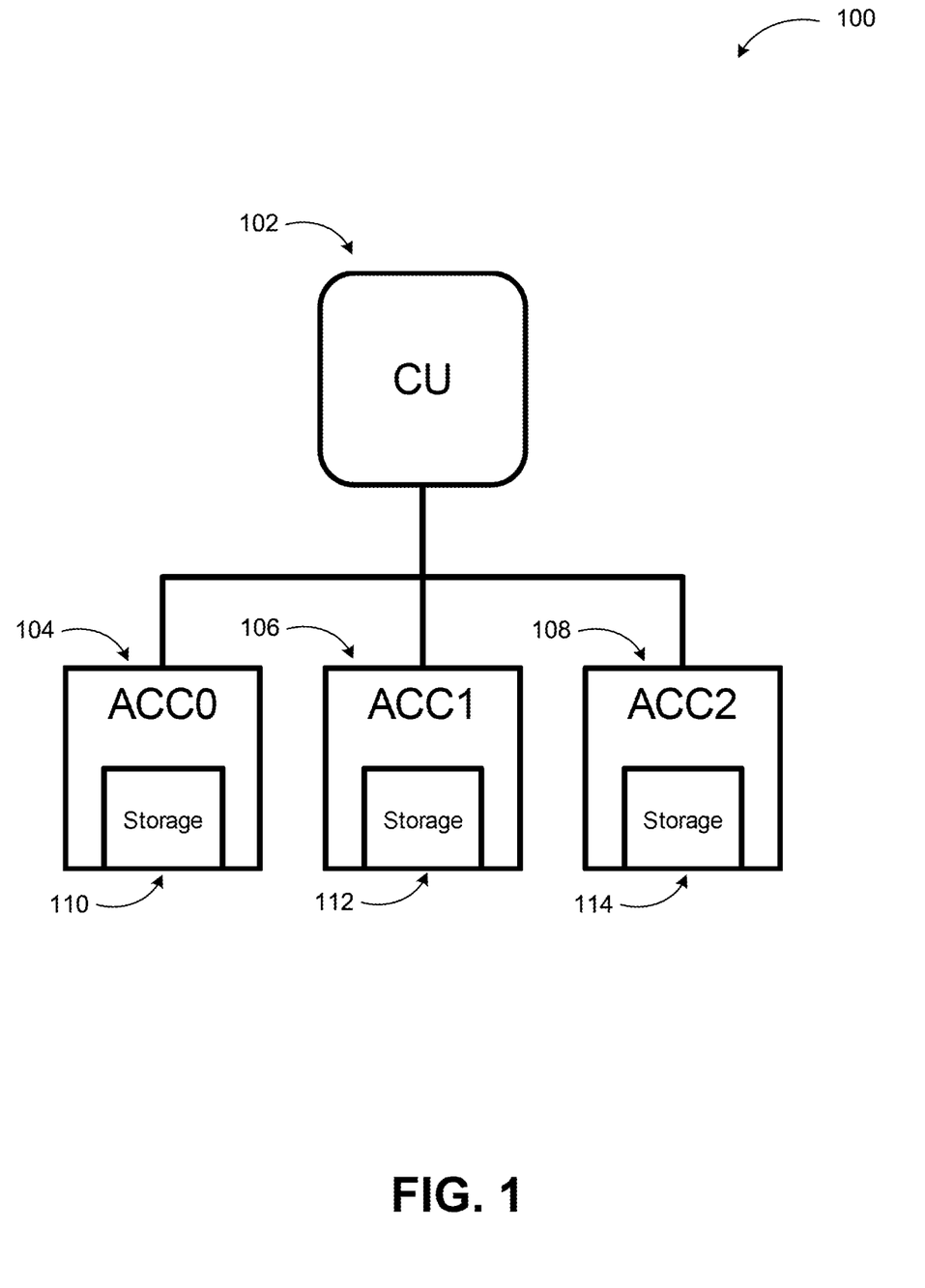
FIG. 1 is a block diagram illustrating major components of a system of multiple accelerators for a neural network.

FIG. 1 is a block diagram illustrating major components of a system of multiple accelerators for a neural network, arranged in accordance with embodiments described herein.

As shown in diagram 100, some embodiments include a controller unit 102 and multiple accelerator units 104, 106, 108. Both the controller unit and the accelerator units have ports for communications. There exists one communication channel between the controller unit and each accelerator units. The controller units control each accelerator's behavior, send data to and receive data from each accelerator through the interconnections.

Each accelerator has integrated storage (110, 112, 114) for storing parameters and values of neural networks. The CU block denotes the controller units. The ACC0, ACC1 and ACC2 blocks are three accelerator units with integrated storages. The interconnections between CU and the accelerators are denoted by lines between them.

Figure 2:
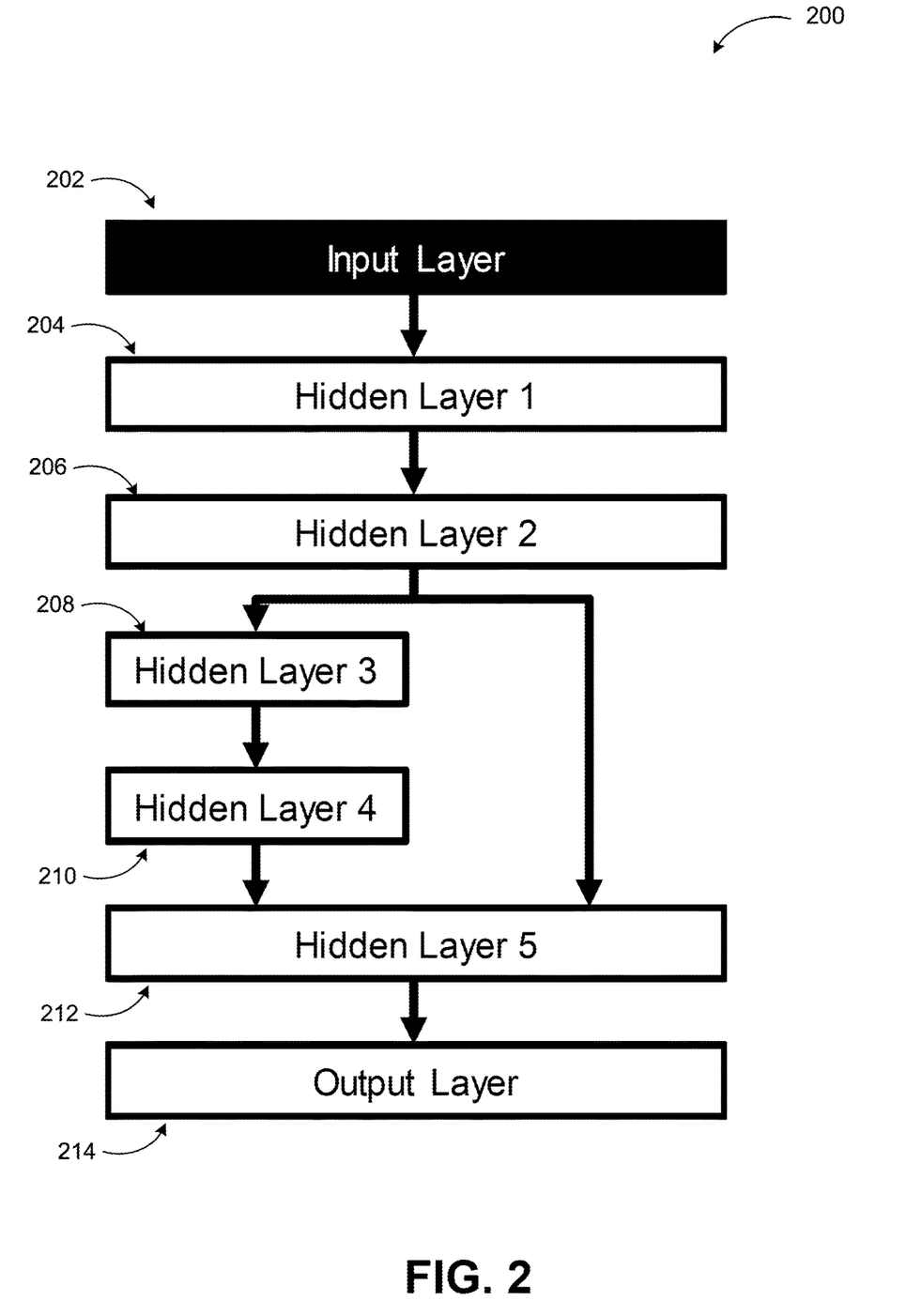
FIG. 2 illustrates layers of an example neural network.

FIG. 2 illustrates layers of an example neural network, arranged in accordance with embodiments described herein.

As shown in diagram 200, an example neural network is defined by an input layer 202, an output layer 214 and optionally multiple hidden layers 204-212. Layers are organized in serial manner that every layer except the input layer accepts data produced by its preceding layers, with the output layer always being the last layer of the network.

For most cases, a layer accepts data from its immediately preceding layer only. However, there is also a special type of layer called residual layer that accepts data from not only its immediately preceding layers but also another preceding layer which is multiple layers prior.

The input layer 202 does not have any preceding layer. It provides primary input data for the neural network instead. The data produced by the output layer 214 is not accepted by any other layer, but is regarded as the final output of the network instead.

The hidden layers 204-212 and the output layer 214 may require extra data called parameters to produce their output data. In general, a layer can be defined by equation $O_l = F_l(I_l, P_l)$, where $O_l$ is the layer's output, $I_l$ is the layer's input, $F_l$ and $P_l$ are the layer's specific function and parameters.

The inferring process of a network is a process of assigning primary input data to the networks input layer, and then generating output data for each hidden layer and the output layer in sequence, and finally collecting the output layer's output data as the primary output of the network.

Diagram 200 shows an example of neural networks. The example network is composed by one input layer 202, 5 hidden layers 204, 206, 208, 210, 212 and one output layer 214, where hidden layer 5 (212) is a residual layer whose input comes from both hidden layer 2 (206) and hidden layer 4 (210).

Figure 3:
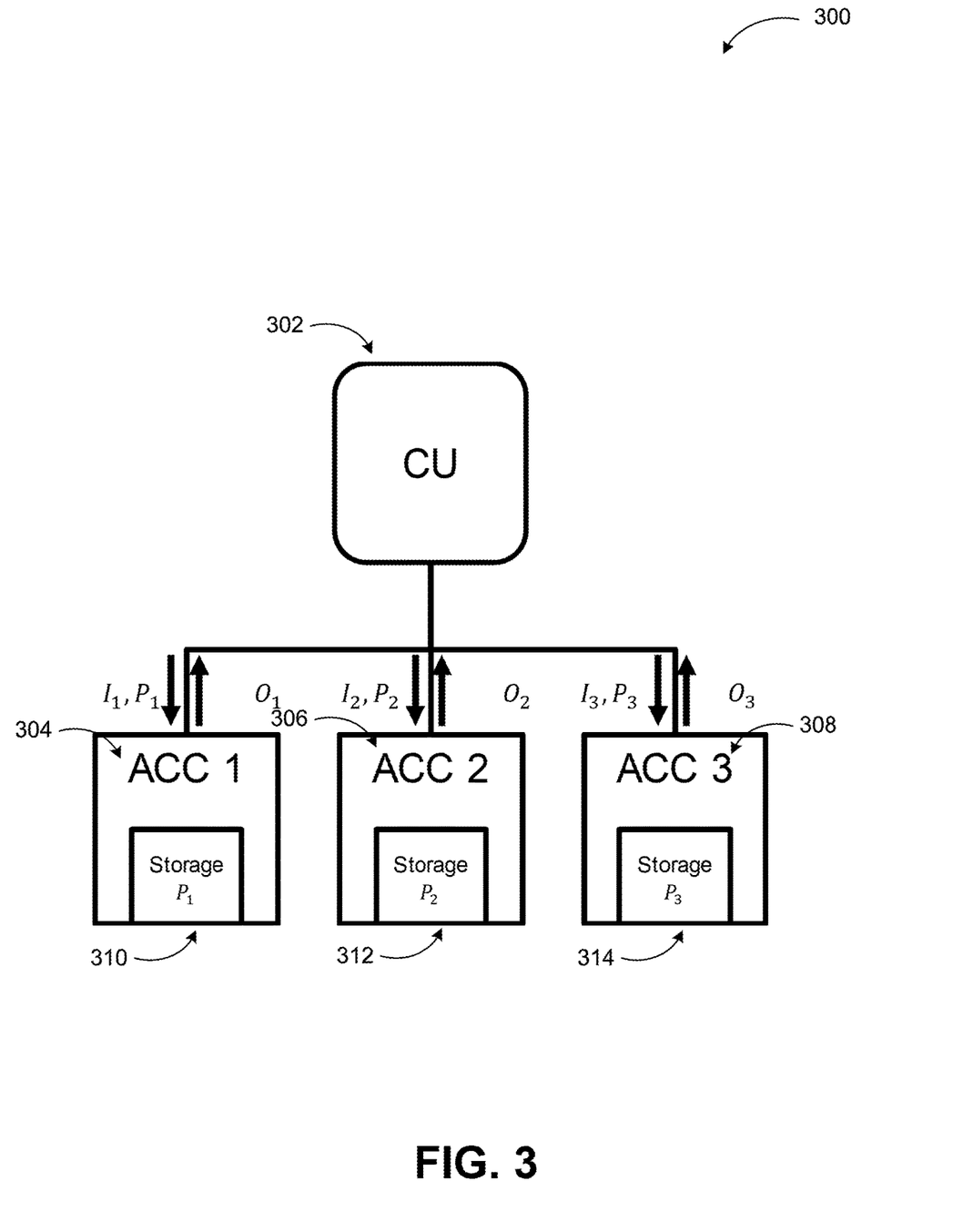
FIG. 3 is a block diagram illustrating major components of a system of multiple accelerators for a neural network and how the neural network can be mapped to the accelerators.

FIG. 3 is a block diagram illustrating major components of a system of multiple accelerators for a neural network and how the neural network can be mapped to the accelerators, arranged in accordance with embodiments described herein.

An accelerator unit according to embodiments is capable of performing all necessary calculations for a neural network layers' functions. By assigning a layer's necessary parameter data to its integrated storage (310, 312, 314), the accelerator unit (304, 306, 308) is capable of producing the layer's output given necessary input data being available to it.

Layers' parameter data remain invariant between different inferring processes. So, the parameter data can be stored onto an accelerator unit before any inferring process starts and can be reused by multiple inferring processes. Multiple layers' computations can be performed in one accelerator as far as the aggregation of their parameter data can be stored into that accelerator's storage.

In case a neural network's parameter aggregation cannot fit into any of the available accelerators, the network is divided into multiple sub-networks so that the parameter aggregation of each sub-network can fit into one accelerator unit.

Parameter data and input data of each sub-network are sent to the corresponding accelerator unit by the controller unit 302 through the communication channel between them. The output data of each sub-network are also collected by the controller unit through the same communication channel.

Diagram 300 illustrates the data flow between the controller unit 302 and the accelerator units 304, 306, 308 for performing a neural network inferring process, where $I_n$, $O_n$ and $P_n$ are the input, output and parameter of sub-network n respectively.

Figure 4:
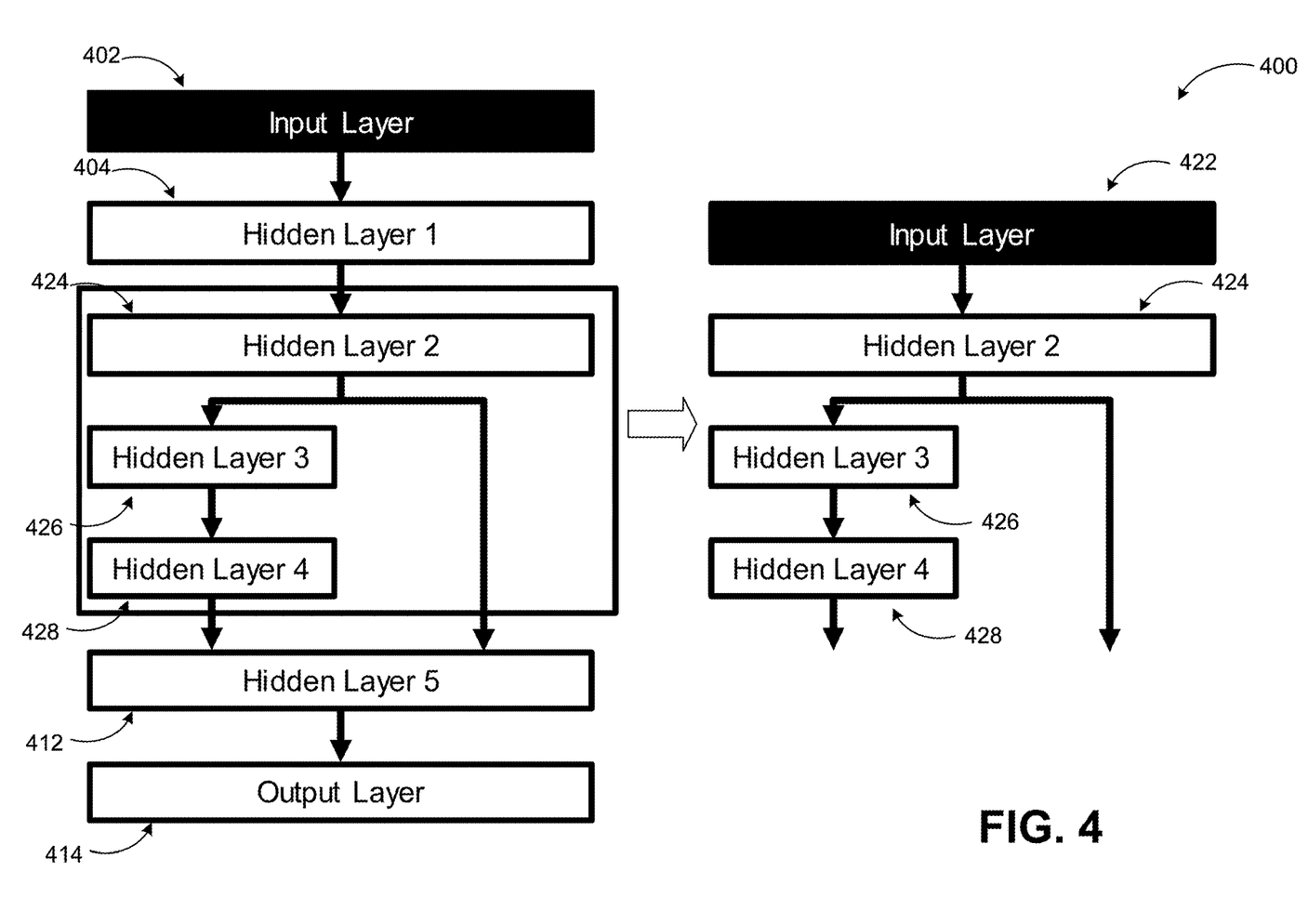
FIG. 4 illustrates how sub-networks can be created by grouping layers of a neural network.

FIG. 4 illustrates how sub-networks can be created by grouping layers of a neural network, arranged in accordance with embodiments described herein.

A sub-network can be built by grouping multiple neighboring layers of a neural network. The primary input data of such sub-network is the aggregation of all input data of the grouped layers except those that are also the output data of the grouped layers. The primary input data can be noted by equation $I_n = \cup_l I_l - \cup_l O_l$, where $I_l$ and $O_l$ denotes the input data set and output data set of a grouped layer l, $\cup$ denotes set union and − denotes set subtraction.

The primary output data of such a sub-network is the aggregation of all output data of the grouped layers except those that are also the input data of the grouped layers. The primary output data can be denoted by equation $O_n = \cup_l O_l - \cup_l I_l$.

The parameter of such sub-network is the aggregation of all the parameter data of the grouped layers. Diagram 400 is an example of such a sub-network built by grouping hidden layers 2, 3 and 4 (424, 426, 428). The input layer 422 provides inputs to the hidden layer 2 (424) the same as those provided by the hidden layer 1 (404). The output of the sub-network is the aggregation of the output of hidden layers 2 and 4 provided to hidden layer 5 (412). An overall output of the neural network is output layer 414.

Figure 5:
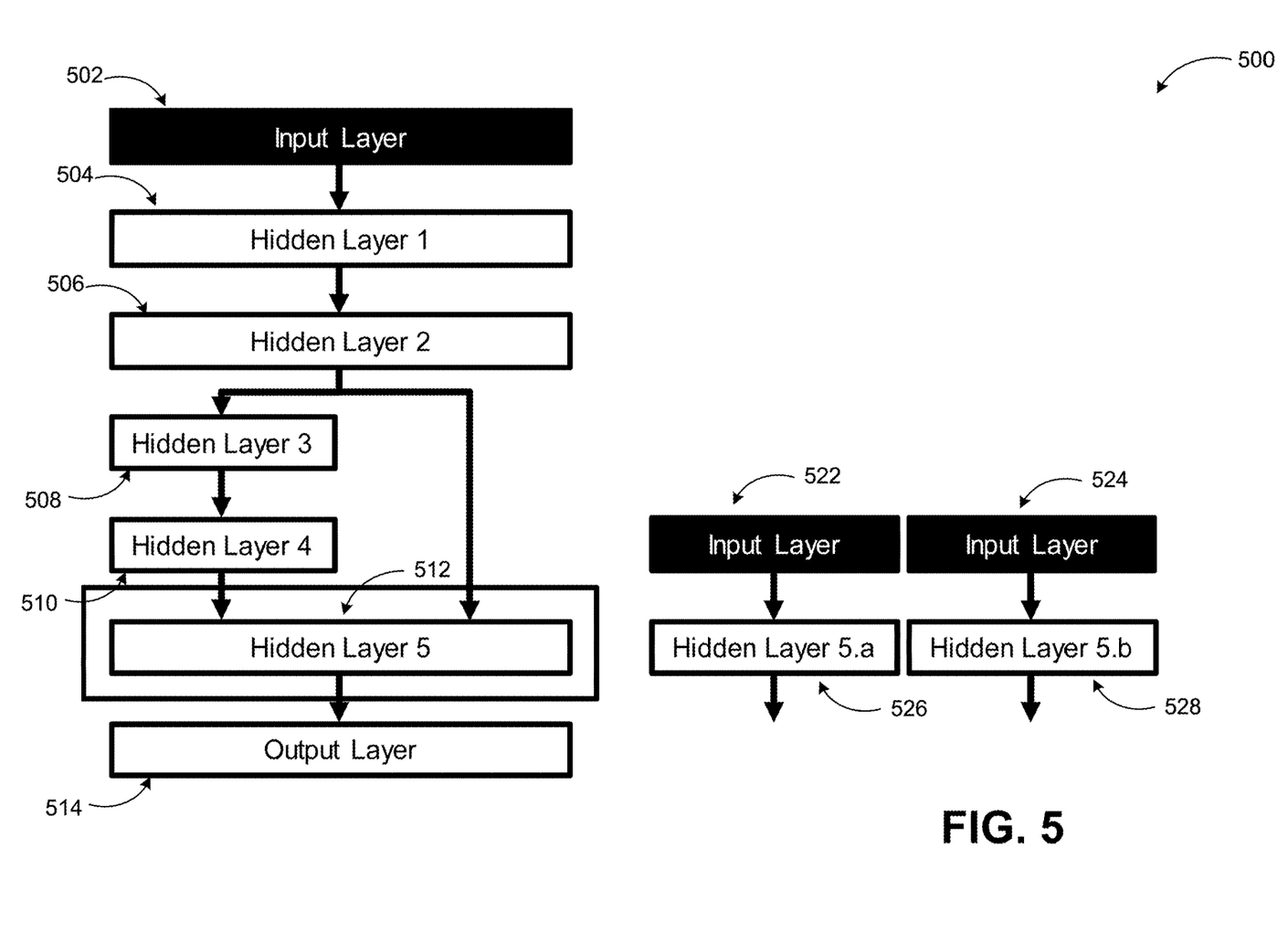
FIG. 5 illustrates how sub-networks can be created by dividing a layer of a neural network.

FIG. 5 illustrates how sub-networks can be created by dividing a layer of a neural network, arranged in accordance with embodiments described herein.

It is also possible that one single layer's parameter data is too large to fit into one accelerator. As far as the layer's function can be rewritten by the following equation, the layer can be divided into multiple smaller sub-layers and fit into multiple accelerators.

$$O_l = F_l(I_l, P_l) = \bigcup_i F_{li}(I_{li}, P_{li})$$

where $I_{li} \subseteq I_l$ and $P_{li} \subseteq P_l$.

The equation above indicates the calculation for layer l can be divided into multiple independent functions, each of which has its own input and parameter data derived from the layer's original input and parameter data.

Diagram 500 includes example neural network with input layer 502, hidden layers 1-5 (504, 506, 508, 510, 512), and output layer 514. Hidden layer 512 receives its input from hidden layers 2 and 4 (506, 510). Hidden layer 5 can be divided into sub-layers 5a and 5b (526 and 528) with input layers 522 and 524 (hidden layers 506, 510).

Figure 6:
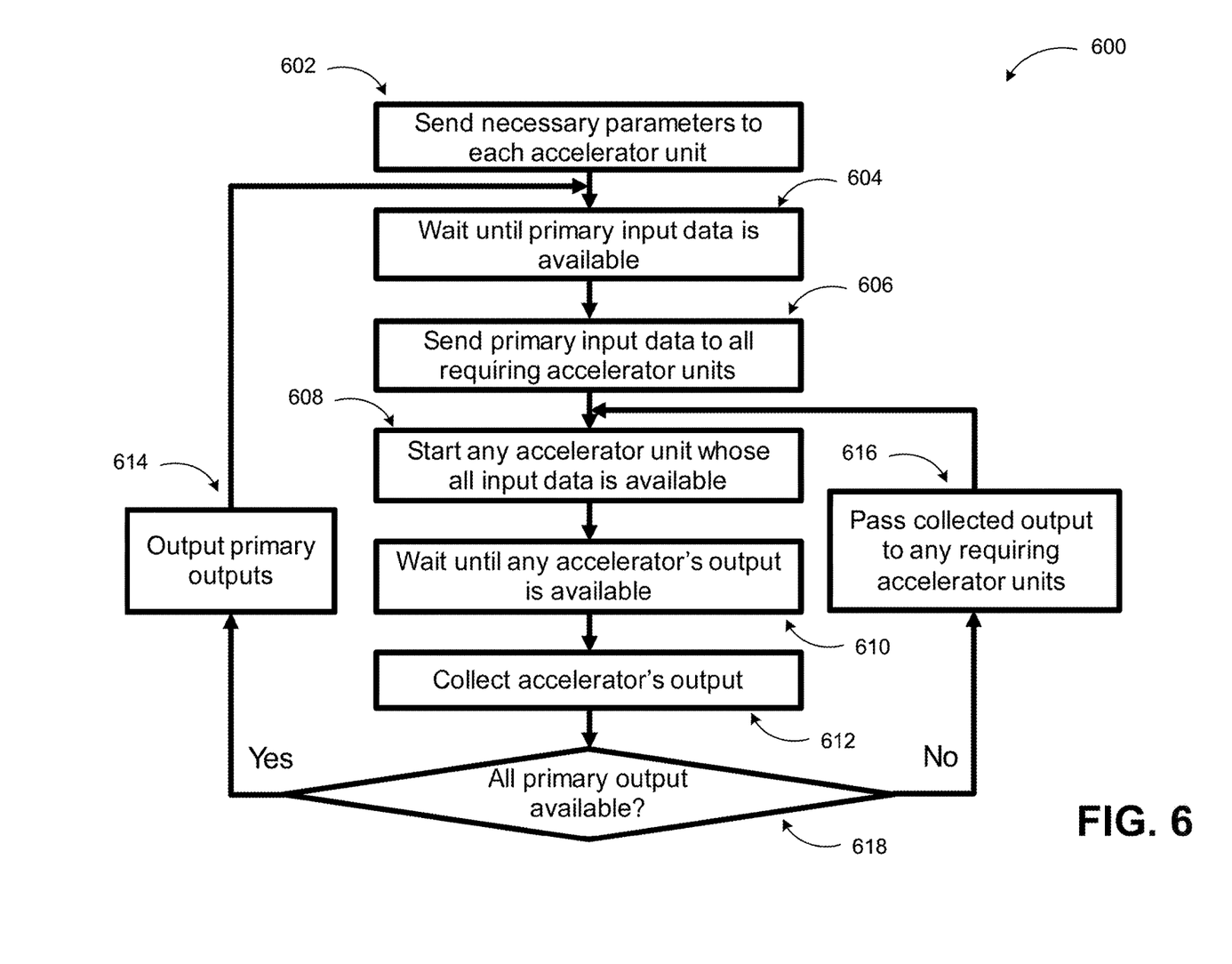
FIG. 6 is a flow diagram illustrating an example process for neural network inferring.

FIG. 6 is a flow diagram illustrating an example process for neural network inferring, arranged in accordance with embodiments described herein.

By dividing a neural network into multiple sub-networks that each sub-network can be fit into one accelerator units, embodiments enable performance of the complete inferring process of the neural network.

The controller unit is responsible for sending necessary input and parameter data to each accelerator unit, controlling accelerator units for sub-network inferring, and collecting sub-network's output data. The flow 600 for an example process according to embodiments starts with sending each sub-network's parameter data to corresponding accelerator units 602 and involves one or multiple loops of network inferring process.

The network inferring process waits until primary input data is available 604 and sends primary inputs to corresponding accelerators 606. In one loop of controlling, any accelerator with all necessary input data available to perform sub-network inferring process is started 608. The process waits until an accelerator output is available 610 and collects the available outputs 612. Until all primary outputs are collected 618, the collected ones are passed on to any other requiring accelerator units 616. The loop stops when all the primary output data is available 618 and the primary outputs are provided 614.

Figure 7:
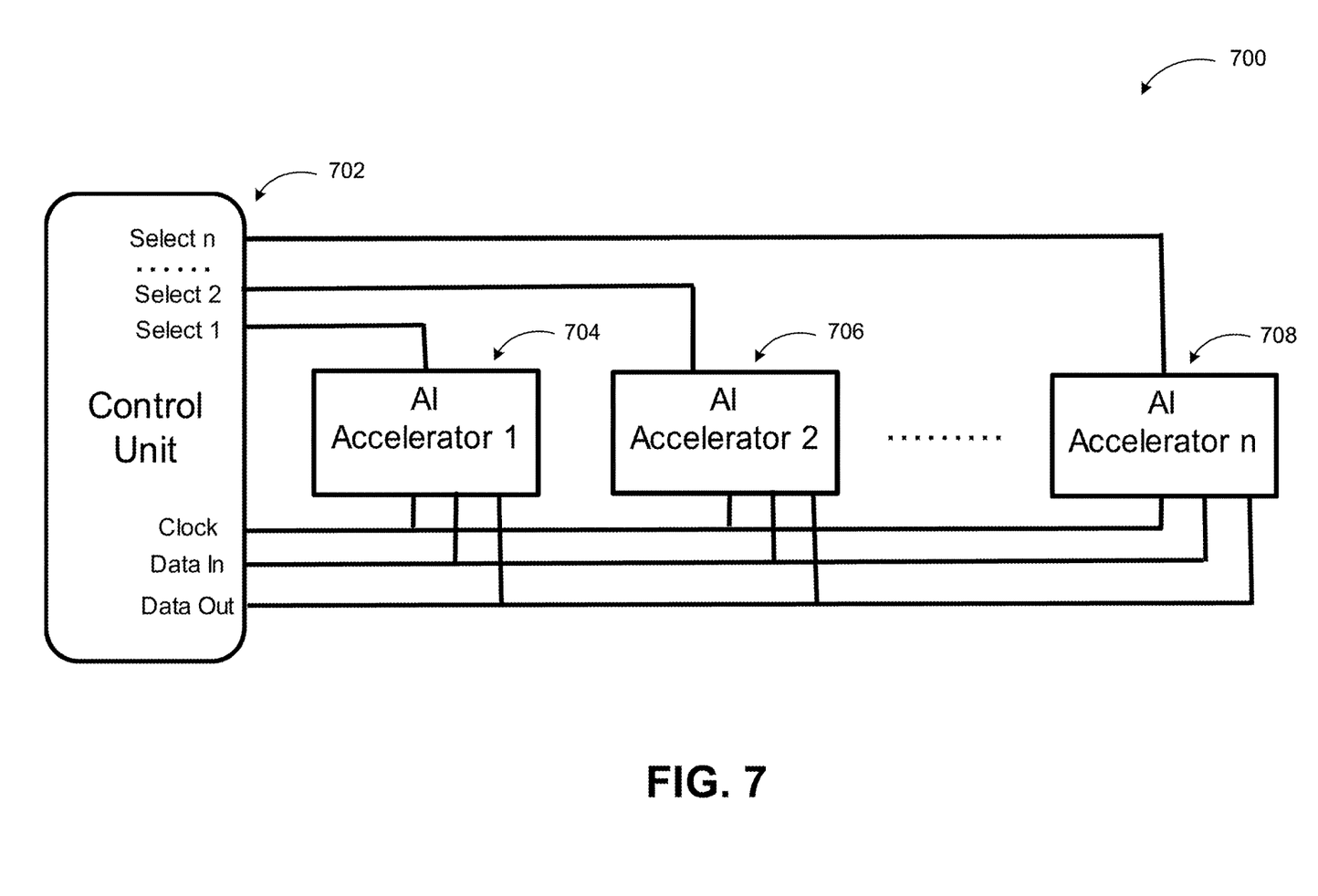
FIG. 7 is a block diagram illustrating an example configuration of multiple accelerators managed by a controller.

FIG. 7 is a block diagram illustrating an example configuration of multiple accelerators managed by a controller, arranged in accordance with embodiments described herein.

As shown in diagram 700, multiple AI accelerators 704, 706, 708 can be controlled and selected by a control unit 702. AI accelerators 704, 706, 708 may be used in a series flow, for example, AI accelerator 1 (704) does the first stage computation, and the first stage results are transferred to AI accelerator 2 (706) as input through the control unit 702; AI accelerator 2 (706) performs the second stage computation, and the second stage results transferred to AI accelerator 3 (708) as input through control unit 702; the process is repeated until the final results are obtained from AI accelerator n (708), and the final results are exported back to the control unit 702 with n equal to or larger than 2. Control unit 702 and AI accelerators 704, 706, 708 may be connected by any data flow interface, such as serial peripheral interface (SPI), double data rate (DDR), peripheral component interconnect express (PCIe), quad serial peripheral interface (QSPI), etc. In the example configuration of diagram 700, control unit 702 provides and receives data to and from each accelerator controlling the data flow between the accelerator units.

Figure 8:
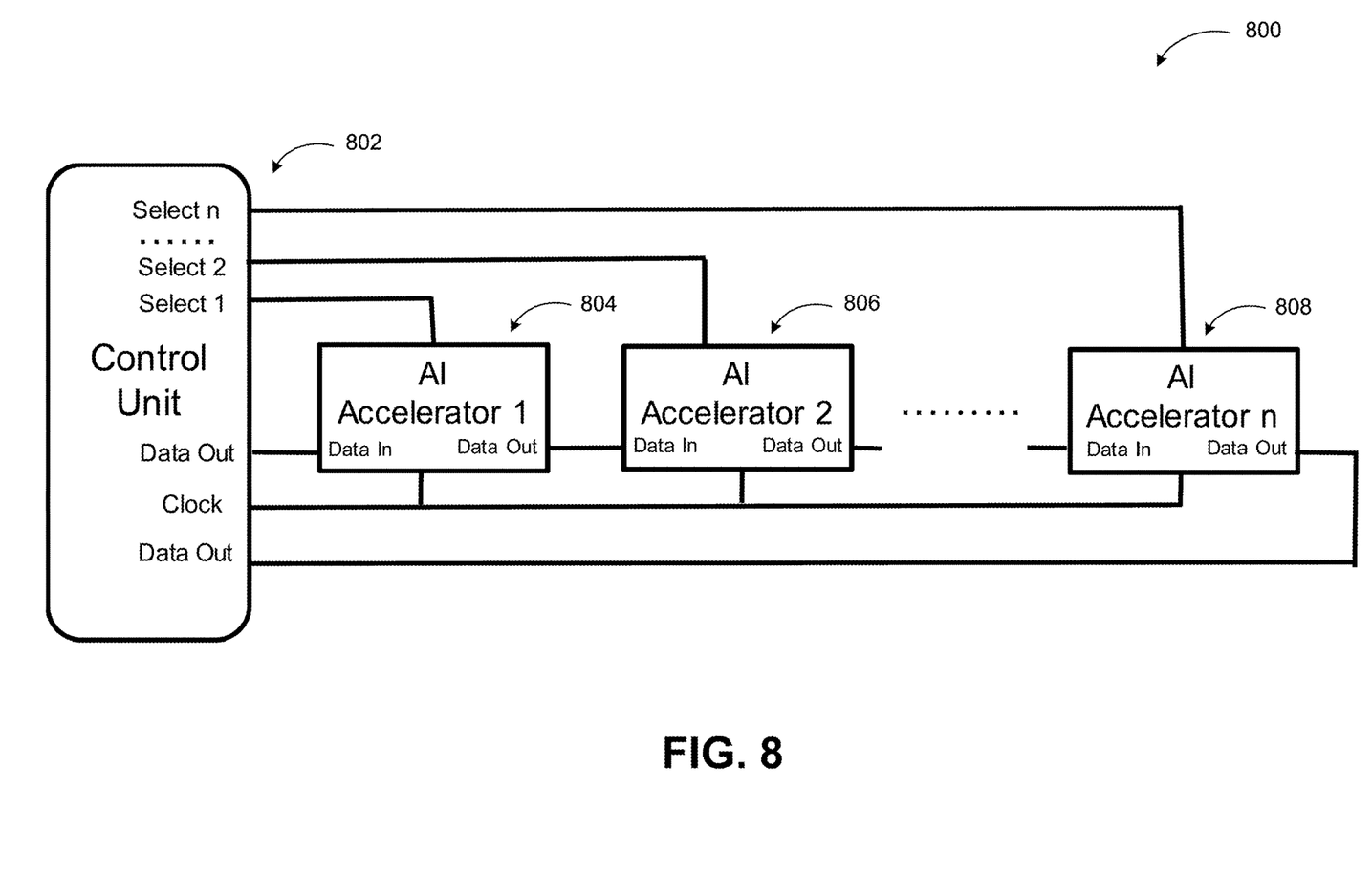
FIG. 8 is a block diagram illustrating another example configuration of multiple accelerators managed by a controller.

FIG. 8 is a block diagram illustrating another example configuration of multiple accelerators managed by a controller, arranged in accordance with embodiments described herein.

As shown in diagram 800, multiple AI accelerators 804, 806, 808 can be controlled and selected by a control unit 802. AI accelerators 804, 806, 808 may be used in a series flow, for example, AI accelerator 1 (804) does the first stage computation, and the first stage results are transferred to AI accelerator 2 (806) as input through the control unit 802; AI accelerator 2 (806) performs the second stage computation, and the second stage results transferred to AI accelerator 3 (808) as input through control unit 802; the process is repeated until the final results are obtained from AI accelerator n (808), and the final results are exported back to the control unit 802 with n equal to or larger than 2. Control unit 802 and AI accelerators 804, 806, 808 may be connected by any data flow interface, such as SPI, DDR, PCIe, etc. In the example configuration of diagram 800, data exchange between the accelerator units is performed directly by the accelerator units. Thus, one accelerator provides its output data to the next accelerator as its input, etc. with the control unit 802 providing the initial data to accelerator unit 1 (804) and receiving the output data from accelerator unit n (808). The control unit 802 only selects the accelerator units to be activated and provides clock signal for operational synchronization, but does not control individual data flow between accelerator units.

Figure 9:
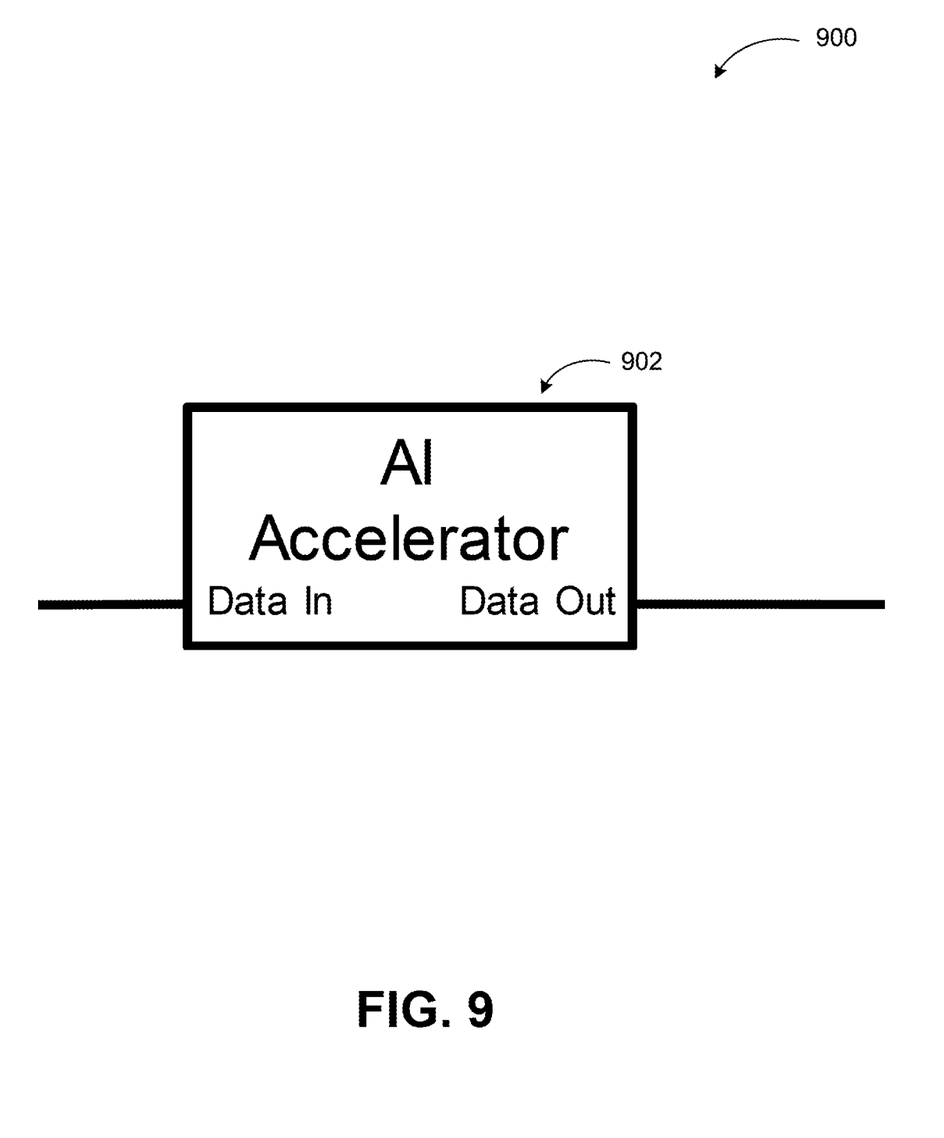
FIG. 9 illustrates an example accelerator chip performing computations without external memories.

FIG. 9 illustrates an example accelerator chip performing computations without external memories, arranged in accordance with embodiments described herein.

Diagram 900 shows an examples AI accelerator chip 902 configured to complete all computations without any external memories (through its internal storage). AI accelerator chip 902 may use SPI or QSPI interface.

Some embodiments are directed to multiple accelerators for neural networks. The operations of any process described herein are not necessarily presented in any particular order and that performance of some or all of the operations in an alternative order(s) is possible and is contemplated. The operations have been presented in the demonstrated order for ease of description and illustration. Operations may be added, combined, modified, omitted, and/or performed simultaneously, in a different order, etc., without departing from the scope of the present disclosure.

The illustrated process can be ended at any time and need not be performed in its entirety. Some or all operations of the processes, and/or substantially equivalent operations, can be performed by execution by one or more processors of computer-readable instructions included on a computer storage media, such as described herein, including a tangible non-transitory computer-readable storage medium. The term "computer-readable instructions," and variants thereof, as used in the description and claims, is used expansively herein to include routines, applications, application modules, program modules, programs, components, data structures, algorithms, or the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, or the like.

Figure 10:
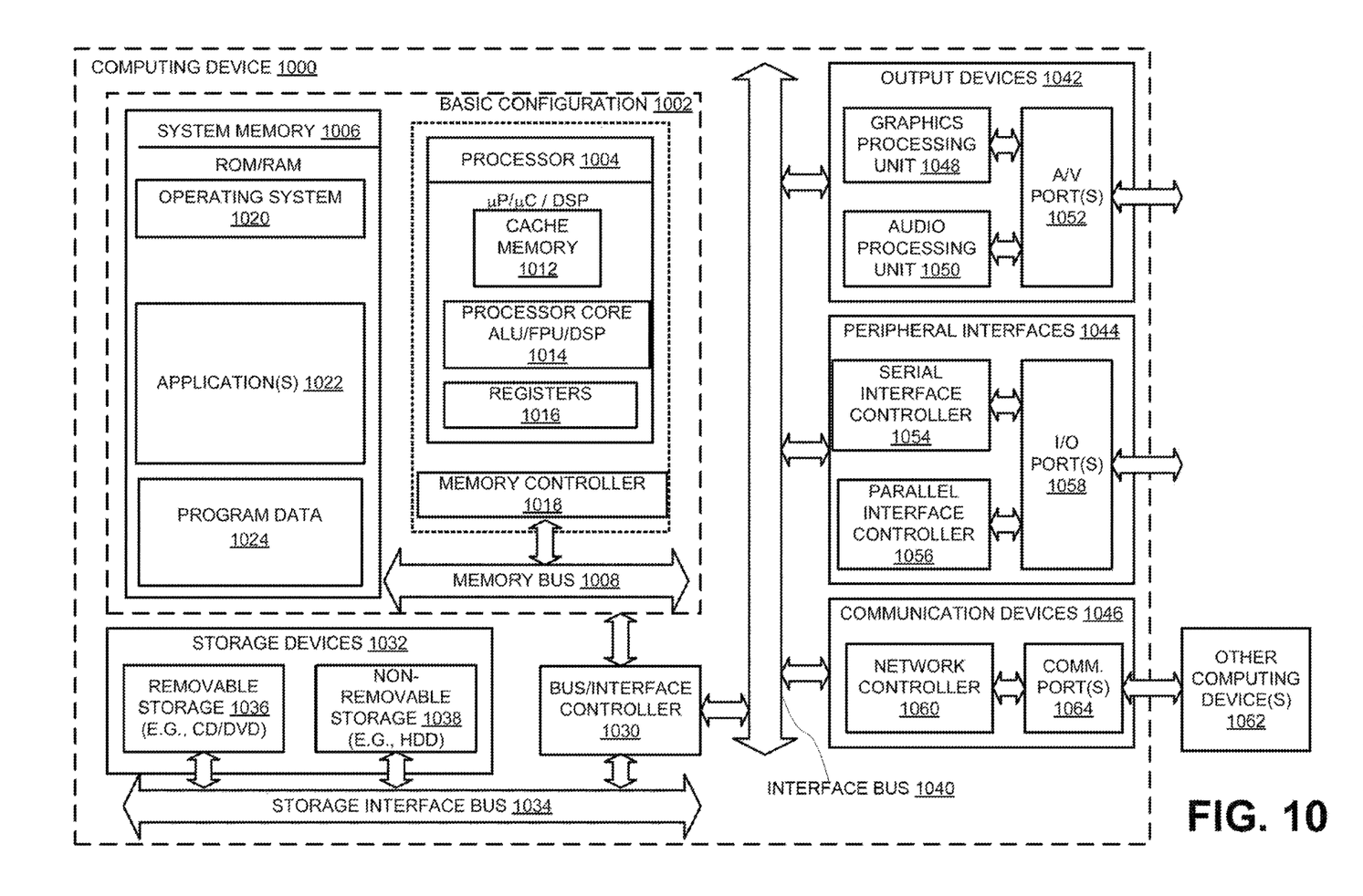
FIG. 10 illustrates an example computing device, where embodiments may be implemented, arranged according to at least some embodiments presented herein.

FIG. 10 is a block diagram illustrating an example computing device 1000 that is arranged to incorporate or operate a digital integrated circuit with embedded memory for neural network inferring, in accordance with at least some embodiments described herein. In a very basic configuration 1002, computing device 1000 typically includes one or more processors 1004 and system memory 1006. A memory bus 1008 can be used for communicating between the processor 1004 and the system memory 1006.

Depending on the desired configuration, processor 1004 can be of any type including but not limited to a microprocessor (µP), a microcontroller (µC), a digital signal processor (DSP), or any combination thereof. Processor 1004 can include one more levels of caching, such as cache memory 1012, a processor core 1014, and registers 1016. The processor core 1014 can include an arithmetic logic unit (ALU), a floating point unit (FPU), a digital signal processing core (DSP core), or any combination thereof. A memory controller 1018 can also be used with the processor 1004, or in some implementations the memory controller 1018 can be an internal part of the processor 1004.

Depending on the desired configuration, the system memory 1006 can be of any type including but not limited to volatile memory (such as RAM), non-volatile memory (such as ROM, flash memory, etc.) or any combination thereof. System memory 1006 typically includes an operating system 1020, one or more applications 1022, and program data 1024.

Computing device 1000 can have additional features or functionality, and additional interfaces to facilitate communications between the basic configuration 1002 and any required devices and interfaces. For example, a bus/interface controller 1040 can be used to facilitate communications between the basic configuration 1002 and one or more data storage devices 1032 via a storage interface bus 1034. The data storage devices 1032 can be removable storage devices 1036, non-removable storage devices 1038, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media can include volatile and nonvolatile, removable and non-removable media implemented in any method or technology for storage of information, such as computer readable instructions, data structures, program modules, or other data.

System memory 1006, removable storage 1036 and non-removable storage 1038 are all examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which can be used to store the desired information and which can be accessed by computing device 1000. Any such computer storage media can be part of device 1000. Thus, any of the computer storage media may be implemented using the circuit structures for convolution applications as discussed herein.

Computing device 1000 can also include an interface bus 1040 for facilitating communication from various interface devices (e.g., output interfaces, peripheral interfaces, and communication interfaces) to the basic configuration 1002 via the bus/interface controller 1030. Example output devices 1042 include a graphics processing unit 1048 and an audio processing unit 1050, which can be configured to communicate to various external devices such as a display or speakers via one or more A/V ports 1052. Example peripheral interfaces 1044 include a serial interface controller 1054 or a parallel interface controller 1056, which can be configured to communicate with external devices such as input devices (e.g., keyboard, mouse, pen, voice input device, touch input device, etc.) or other peripheral devices (e.g., printer, scanner, etc.) via one or more I/O ports 1058. An example communication device 1046 includes a network controller 1060, which can be arranged to facilitate communications with one or more other computing devices 1062 over a network communication via one or more communication ports 1064. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, communication media can include wired media such as a wired network or direct-wired connection, and wireless media such as acoustic, radio frequency (RF), infrared (IR) and other wireless media. The term computer readable media as used herein can include both storage media and communication media.

Computing device 1000 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1000 can also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, compounds, or compositions, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include, but not be limited to, systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

Further, the use of the terms "first," "second," "third," "fourth," and the like is to distinguish between repeated instances of a component or a step in a process and does not impose a serial or temporal limitations unless specifically stated to require such serial or temporal order.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," or the like include the number recited and refer to ranges which can be subsequently broken down into subranges as discussed above. Finally, as will be understood by one skilled in the art, a range includes each individual member. Thus, for example, a group having 1-3 elements refers to groups having 1, 2, or 3 elements. Similarly, a group having 1-5 elements refers to groups having 1, 2, 3, 4, or 5 elements, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A method for organizing a neural network, the method comprising:
   determining that parameter data associated with a layer of the neural network is too large to fit in an internal storage of an accelerator circuit, wherein the neural network is implemented as a structure comprising at least one control circuit and a plurality of accelerator circuits;
   determining a number of accelerator circuits needed to store the parameter data associated with the layer;
   creating a plurality of sub-layers by dividing the layer into the sub-layers based on the number of accelerator circuits needed to store the parameter data associated with the layer, wherein each of the sub-layers is configured to receive its respective input data from a preceding layer of the layer and to provide its respective output data to a subsequent layer of the layer;
   mapping a single accelerator circuit to each of the created sub-layers; and
   creating one or more sub-networks within the neural network by grouping two or more neighboring layers, wherein
   primary input data of a created sub-network is an aggregation of all input data of the grouped two or more neighboring layers except data that is output by one of the grouped two or more neighboring layers, and the primary input data is defined by $I_n = \cup_l I_l - \cup_l O_l$, where $I_l$ and $O_l$ denote an input data set and an output data set of each grouped layer l, $\cup$ denotes set union, and – denotes set subtraction.

2. A neural network computation device for performing the method of claim 1, comprising:
   a controller circuit; and
   a plurality of accelerator circuits, wherein
   layers of a neural network are mapped to one or more of the accelerator circuits,
   each accelerator unit includes an internal data storage to store parameters and values associated with the neural network,
   the controller circuit and the plurality of accelerator circuits are communicatively coupled through an interconnection system, and
   the controller circuit includes selection outputs to select individual accelerator circuits, a clock output to provide a clock signal to the accelerator circuits, at least one data input and at least one data output.

3. The device of claim 2, wherein the controller circuit includes one data input to receive output data from a last one of the plurality of accelerator circuits and one data output to provide initial data to a first one of the plurality of accelerator circuits.

4. The device of claim 3, wherein the each of the plurality of accelerator circuits is configured to receive input data from a preceding accelerator circuit, computer results, and provide computation result data to a subsequent accelerator circuit.

5. The device of claim 2, wherein the controller circuit includes one data output to provide data to each of the plurality of accelerator circuits and one data input to receive output data from each of the plurality of accelerator circuits.

6. The device of claim 2, wherein the controller circuit is configured to select accelerator circuits based on a storage capacity of each accelerator circuit and an amount of data to be processed by each layer of the neural network.

7. The device of claim 2, further comprising at least one more controller circuit, wherein the controller circuits are configured to manage all of the plurality of accelerator circuits.

8. The device of claim 2, further comprising at least one more controller circuit, wherein the controller circuits are configured to manage respective subsets of the plurality of accelerator circuits.

9. The device of claim 2, wherein the interconnection system includes serial peripheral interface (SPI), double data rate (DDR), peripheral component interconnect express (PCIe), or quad serial peripheral interface (QSPI).

10. A method for operating a neural network implemented as a neural network computation device of claim 2, the method comprising:
    providing parameter data to each of the plurality of accelerator circuits;
    upon detecting available primary input data, providing the primary input data to the plurality of accelerator circuits;
    activating accelerator circuits to perform computations on the provided primary input data; and
    upon detecting available output data from one or more accelerator circuits, collecting the output data from the one or more accelerator circuits.

11. The method of claim 10, further comprising:
    until all primary output data is collected, providing collected output data to respective accelerator circuits; and
    activating the respective accelerator circuits to perform computations on the provided output data.

12. The method of claim 10, further comprising:
    upon detecting that all primary output data is collected, providing the primary output data to a recipient of an output of the neural network; and
    waiting to detect new primary input data.

13. The method of claim 10, wherein primary input data is provided to an input layer of the neural network, input data is provided to any of hidden layers of the neural network, primary output data is received from an output layer of the neural network, and output data is received from any of the hidden layers of the neural network.

14. The method of claim 10, wherein data is provided to and collected from internal storages of each of the plurality of accelerator circuits.

15. The method of claim 10, wherein data is provided to and collected from the plurality of accelerator circuits through an interconnection system comprising serial peripheral interface (SPI), double data rate (DDR), peripheral component interconnect express (PCIe), or quad serial peripheral interface (QSPI).

16. The method of claim 1, wherein a function of the layer is defined by:

$$O_l = F_l(I_l, P_l) = J(F_{l1}(I_{l1}, P_{l1}), F_{l2}(I_{l2}, P_{l2}), \ldots, F_{ln}(I_{ln}, P_{ln}))$$

where for all $i \in [1,n]$, $I_{li} \subseteq I_l$ and $P_{li} \subseteq P_l$ are subsets of the layer's inputs and parameters respectively, $F_{li}$ is a function produces partial or intermediate results of $F_l$ and J is a function that produces the result of $F_l$ by the results of $F_{li}$.

17. The method of claim 1, wherein
primary output data of a created sub-network is an aggregation of all output data of the grouped two or more neighboring layers except data that is input to one of the grouped two or more neighboring layers, and
the primary output data is defined by, $$O_n = \cup_l O_l - \cup_l I_l$$

where $I_l$ and $O_l$ denote an input data set and an output data set of each grouped layer l, $\cup$ denotes set union, and – denotes set subtraction.

18. The method of claim 1, wherein parameter data of a created sub-network is an aggregation of all parameter data of the grouped two or more neighboring layers.

* * * * *